United States Patent
Crocker et al.

(10) Patent No.: US 8,462,727 B2
(45) Date of Patent: Jun. 11, 2013

(54) METHOD AND SYSTEM FOR STREAMLINED CALL SETUP

(75) Inventors: Ronald T. Crocker, St. Charles, IL (US); John M. Harris, Chicago, IL (US); Pranavkumar L. Joshi, Schaumburg, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1446 days.

(21) Appl. No.: 11/373,751

(22) Filed: Mar. 10, 2006

(65) Prior Publication Data

US 2007/0211744 A1    Sep. 13, 2007

(51) Int. Cl.
*H04W 4/00* (2009.01)

(52) U.S. Cl.
USPC ......... 370/331; 455/450; 455/509; 455/452.1

(58) Field of Classification Search
USPC .................. 455/452.1, 450, 509; 370/331
See application file for complete search history.

(56) References Cited

U.S. PATENT DOCUMENTS

| | | | | |
|---|---|---|---|---|
| 6,097,733 A * | 8/2000 | Basu et al. | | 370/468 |
| 6,212,389 B1 * | 4/2001 | Fapojuwo | | 455/453 |
| 6,483,820 B1 * | 11/2002 | Davidson et al. | | 370/329 |
| 6,628,668 B1 * | 9/2003 | Hutzli et al. | | 370/468 |
| 6,647,271 B1 * | 11/2003 | Doi | | 455/464 |
| 6,785,252 B1 * | 8/2004 | Zimmerman et al. | | 370/337 |
| 6,879,834 B2 * | 4/2005 | Virtanen | | 455/452.2 |
| 6,909,691 B1 * | 6/2005 | Goyal et al. | | 370/230 |
| 6,944,148 B1 * | 9/2005 | Gehring et al. | | 370/347 |
| 7,006,530 B2 * | 2/2006 | Spinar et al. | | 370/468 |
| 7,089,017 B2 * | 8/2006 | Chen et al. | | 455/453 |
| 7,469,141 B2 * | 12/2008 | Macridis et al. | | 455/427 |
| 7,499,421 B2 * | 3/2009 | Lee et al. | | 370/321 |
| 2003/0064730 A1 * | 4/2003 | Chen et al. | | 455/453 |
| 2003/0095538 A1 * | 5/2003 | Kayama et al. | | 370/350 |
| 2003/0181214 A1 * | 9/2003 | Grob et al. | | 455/515 |
| 2004/0006771 A1 | 1/2004 | Dale et al. | | |
| 2004/0127226 A1 * | 7/2004 | Dugad et al. | | 455/450 |
| 2004/0203832 A1 * | 10/2004 | An | | 455/453 |
| 2004/0259559 A1 * | 12/2004 | Li et al. | | 455/452.1 |
| 2005/0048983 A1 * | 3/2005 | Abraham et al. | | 455/452.1 |
| 2005/0076244 A1 | 4/2005 | Watanabe | | |
| 2005/0124350 A1 * | 6/2005 | Wu | | 455/452.2 |
| 2005/0143083 A1 * | 6/2005 | Kwon et al. | | 455/452.1 |
| 2006/0035641 A1 * | 2/2006 | Moon et al. | | 455/448 |
| 2006/0045001 A1 * | 3/2006 | Jalali | | 370/208 |

FOREIGN PATENT DOCUMENTS

WO    2005020031 A2    2/2006

* cited by examiner

*Primary Examiner* — Kwasi Karikari

(57) ABSTRACT

A method (300) and communication device (106) capable of streamlining call setups to a wireless mobile unit (102) may include a transceiver (520) and a controller (502). In various embodiments of the invention, the controller detects (302) a modified request for a communication resource, optionally monitors (304) a communication system loading parameter, and sends (406 or 408) an assignment for a larger than anticipated allocation of the communication resource upon detecting the modified request or when the system loading parameter falls below a predetermined threshold. The controller may also receive (410) via the larger than anticipated allocation of the communication resource both an anticipated initial data transmission and an initial user data transmission in a first data transmission from the mobile wireless unit.

20 Claims, 4 Drawing Sheets

100

200

400

METHOD AND SYSTEM FOR STREAMLINED CALL SETUP

RELATED APPLICATION

U.S. patent application Ser. No. 11/624,428, by Harris et al., filed concurrently herewith and entitled "Method and Apparatus for Spreading Channel Code Selection."

FIELD

This invention relates generally to communication systems and standards, and more particularly to a method and system of streamlining call setup procedures.

BACKGROUND

The current standard for call setups for sending messages to and from idle mobile radios using the IEEE 802.16e standard is complicated and "chatty" requiring frequent transmissions back and forth before establishing such channel communication. There are several applications where the setup time or setup delay can be significantly reduced for the 802.16 or Wi-Max standard.

A simplified example of the current sequence of messages sent by a mobile can be described as follows:

Mobile Subscriber (MS) sends: _Hey!—please give me an assignment to indicate who I am. This action is more commonly known as a mobile radio performing initial ranging.
Network or base station (BS) sends: short assignment
MS sends: _I am "John", please give me an assignment so I can send some payload/my invite
Network sends: large assignment for bearer channel
MS sends: _Here is my bearer channel/invite . . .

In Orthogonal Frequency Division Multiplexing (OFDM), the tendency is to use this chatty approach—so the initial "Hey" (which does not benefit from OFDM) has minimum length.

SUMMARY

Embodiments in accordance with the present invention can include modifications to the 802.16e system to support faster call setups, particularly with applications such as Push-to-Talk (PTT), Push-to-connect over cellular (PoC), and Voice over IP (VoIP). In some instances, methods and systems herein can enable an invite to the network about 200 milliseconds sooner and reduce a PTT delay by approximately 15%. One of the ways in accordance with the disclosure herein to achieve such improvement is to allocate sufficient bandwidth on an initial access with the network and to send a packet along with the initial request message (in the case of an 802.16e system, the initial request message would include a range request or "RNG REQ"). Of course, the embodiments are not limited to a 802.16 or "WiMAX" system, but can certainly encompass other communication systems where mobile wireless units or network infrastructure equipment can use the systems and methods disclosed herein for improving call setups generally.

In a first embodiment of the present invention, a method of streamlining an initial user data transmission from a wireless mobile unit to a communication system may include the steps of sending a request for an initial communication resource to the communication system, receiving from the communication system a larger than anticipated assignment of the initial communication resource, and using the larger than anticipated assignment of the initial communication resource to send both an anticipated initial data transmission and the initial user data transmission in a first data transmission. The anticipated initial data transmission may include a plurality of data items among a list of data items including a range request and an authentication response and the initial user data transmission can be an IP packet. The step of sending the request may include sending an unmodified request for an initial communication resource to the communication system and the method can further receive from the communication system a larger than anticipated assignment of the initial communication resource if the communication system determines an under-utilized loading capacity. In another refinement, the step of sending the request may include sending an unmodified request for the initial communication resource to the communication system and receiving from the communication system the larger than anticipated assignment of the initial communication resource if at least among the following is true: that the communication system determines an under-utilized loading capacity; that the wireless mobile unit originated on a ranging code set aside for a specific service; or that the wireless mobile unit originated on a ranging code set aside for wireless mobiles with particularly good signal strength.

Sending the request may involve sending a modified request for the initial communication resource which causes the communication system to send the larger than anticipated assignment of the initial communication resource. The method may further include the step of receiving a paging message from the communication system instructing the wireless mobile unit to send the request for the initial communication resource to the communication system.

The method may also perform similarly when the mobile wireless unit has sent an unmodified request for the initial communication resource to the communication system and has received from the communication system the larger than anticipated assignment of the initial communication resource. In this regard, the method may use the larger than anticipated assignment of the initial communication resource to send only the anticipated initial data transmission, complete a set of actions associated with the anticipated data transmission, and send the initial user data transmission after completing the set of actions associated with the anticipated data transmissions.

In a second embodiment of the present invention, a method of streamlining an initial user data transmission from a wireless mobile unit to a communication system may include the steps of detecting a modified request for an initial communication resource from the wireless mobile unit, sending an assignment for a larger than anticipated allocation of the initial communication resource to the wireless mobile unit upon detecting the modified request, and receiving, via the larger than anticipated assignment of the initial communication resource, both an anticipated initial data transmission and the initial user data transmission in a first data transmission from the wireless mobile unit. The method may further include the steps of detecting an unmodified request for an initial communication resource from the wireless mobile unit, monitoring loading parameters for the communication system, and sending the assignment for the larger than anticipated allocation of the initial communication resource to the wireless mobile unit when the loading parameters are below a predetermined threshold. Note, the anticipated initial data transmission may include a plurality of data items among a list of data items including a range request and an authentication response and the initial user data transmission can be an IP packet.

The method of the second embodiment may further include the steps of authenticating the mobile wireless unit based at least in part on information contained within the anticipated initial data transmission, delaying the fulfillment of a set of actions associated with the anticipated initial data transmission until authenticating the mobile wireless unit is completed, and delay processing of the initial user data transmission until authenticating the mobile wireless unit is completed. The method may further forward bearer data to the mobile wireless unit upon authentication with the mobile wireless unit.

A third embodiment of the present invention encompasses a mobile wireless unit capable of streamlining an initial user data transmission from a wireless mobile unit to a communication system. The mobile wireless unit may include a transceiver and a controller coupled to the transceiver. The controller may be programmed to send a request for an initial communication resource to the communication system, receive from the communication system a larger than anticipated assignment of the initial communication resource, and use the larger than anticipated assignment of the initial communication resource to send both an anticipated initial data transmission and the initial user data transmission in a first data transmission. The anticipated initial data transmission may include a plurality of data items from a list of data items including a range request and an authentication response and the initial user data transmission is an IP packet. The controller may be further programmed to send an unmodified request for an initial communication resource to the communication system, and receive from the communication system the larger than anticipated assignment of the initial communication resource when a loading parameter measured at the communication is below a predetermined threshold. The controller may be further programmed to receive a paging message from the communication system instructing the mobile wireless unit to send a request for an initial communication resource to the communication system. The mobile wireless unit may streamline call setups for a Voice over Internet Protocol (VoIP) call setup or for a push-to-talk call setup or for a push-to-connect over cellular (PoC) call setup.

A fourth embodiment of the present invention encompasses a communication device capable of streamlining an initial user data transmission from a wireless mobile unit that includes a transceiver and a controller coupled to the transceiver. The controller may be programmed to detect a modified request for an initial communication resource from the wireless mobile unit, send an assignment for a larger than anticipated allocation of the initial communication resource to the wireless mobile unit upon detecting the modified request, and receive, via the larger than anticipated assignment of the initial communication resource, both an anticipated initial data transmission and the initial user data transmission in a first data transmission from the wireless mobile unit. The controller may be further operating within a communication system and programmed to detect an unmodified request for an initial communication resource from the wireless mobile unit, monitor loading parameters for the communication system, and send an assignment for a larger than anticipated allocation of the initial communication resource to the wireless mobile unit when the loading parameters are below a predetermined threshold. The controller may also be programmed to authenticate the mobile wireless unit based at least in part on information contained within the anticipated initial data transmission, delay the fulfillment of a set of actions associated with the anticipated initial data transmission until authenticating the mobile wireless unit is completed, and delay processing the initial user data transmission until authenticating the mobile wireless unit is completed.

Other embodiments, when configured in accordance with the inventive arrangements disclosed herein, may include a system for performing and a machine readable storage for causing a machine to perform the various processes and methods disclosed herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

DETAILED DESCRIPTION OF THE DRAWINGS

Figure 1:
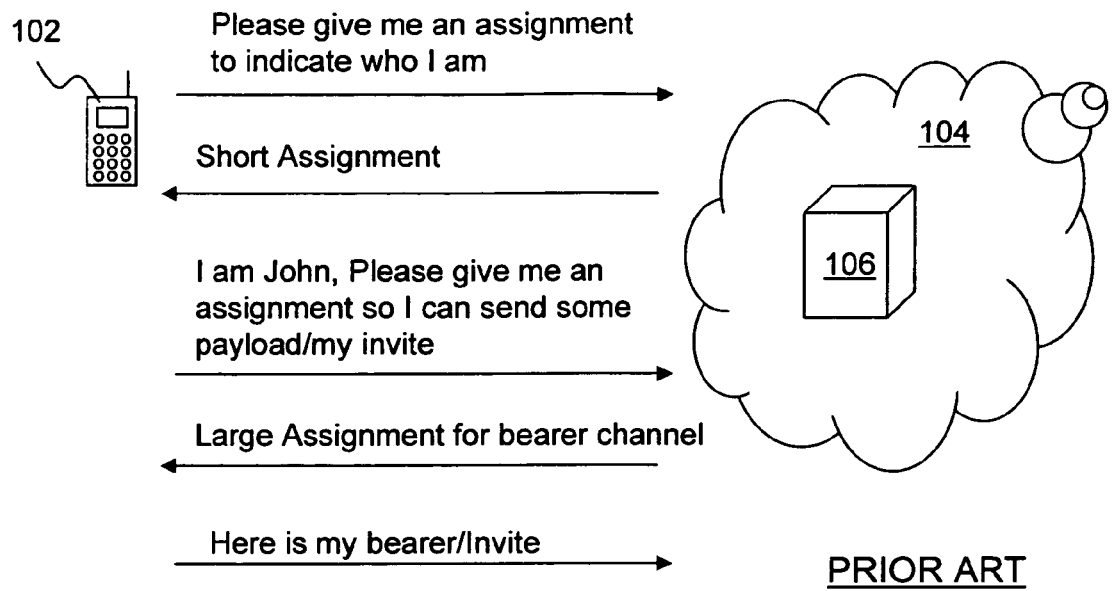
FIG. 1 is an illustration of an existing call setup process.

While the specification concludes with claims defining the features of embodiments of the invention that are regarded as novel, it is believed that the invention will be better understood from a consideration of the following description in conjunction with the figures, in which like reference numerals are carried forward.

Referring to FIG. 1, a simplified illustration of an existing call setup process 100 demonstrates how an existing system includes unnecessary delays. The current sequence of messages between a mobile wireless unit or subscriber 102 and a mobile network 104 or a base station 106 within the mobile network 104 may include a request for an assignment to indicate "who" the mobile subscriber (MS) 102 is and the network 104 subsequently sends a short assignment. Once the short assignment is given to the MS 102, the MS 102 further requests an assignment to enable the sending of a payload and an invite. The mobile network 104 then sends the MS 102 a large assignment for the bearer channel or data. The MS 102 then responds with its bearer data and invite.

The process described above is chatty and provides opportunities for improvement. In several embodiments of the present invention described herein a method or process is provided, such as the method or process 200 illustrated in FIG. 2, that may create a mechanism to enable the mobile wireless unit to send the invite to the network much earlier or to significantly reduce a PTT service delay. In some instances, the PTT service delay can be reduced by approximately 15% or by 200 milliseconds.

Figure 2:
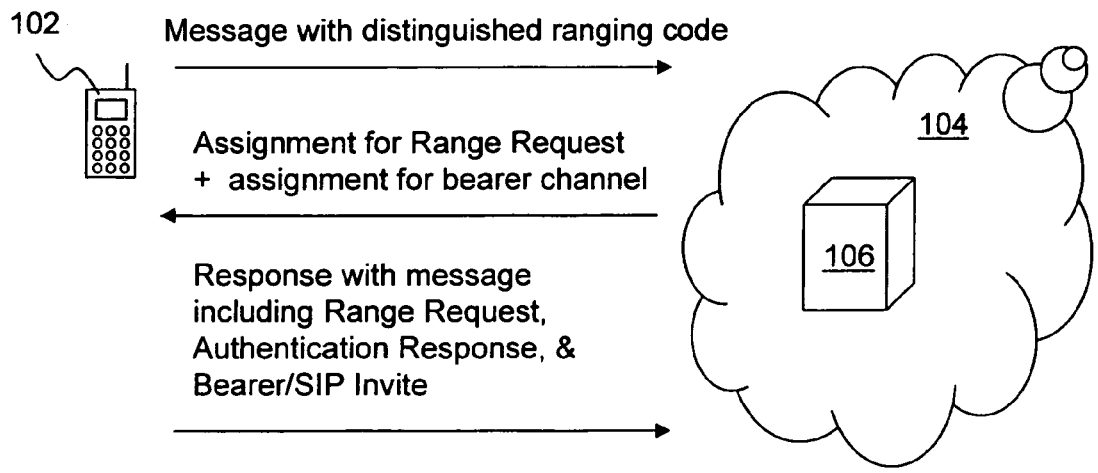
FIG. 2 is an illustration of a call setup process in accordance with an embodiment of present invention.

In the specific example illustrated in FIG. 2, if the network 104 detects that it has received a special type of message having, for example, a distinguished ranging code or a new category of code, or if the network 104 detects that the system or network 104 is under loaded, then the network 104 sends the MS 102 an assignment for the range request as well as an assignment for the bearer. In this manner, the system encourages utilization of uplink resources that would otherwise go unused. The MS 102 responds with a new message including a range request (RNG_REQ), an authentication response, and a bearer/SIP invite. The method or process 200 may use end-to-end encryption for the payload, but not necessarily the IP address (unless some form of IP security is available). The MS 102 may also optionally provide an indication that it does not currently have a caller identifier or CID.

Note, the ranging code may be considered to comprise implicit bandwidth requests and more particularly requests for enough bandwidth to send a particular kind of message. For example, a code in a set "A" may indicate a simple bandwidth request message for allocating enough bandwidth to support such message, a code in set "B" may indicate the desire for a handoff request and the allocation of enough bandwidth to support such handoff request message, or a code in set "C" may indicate the desire to send an initial ranging request and an allocation of enough bandwidth to support the initial ranging request message. The manner in which the codes are implemented and interpreted to invoke a particular method as contemplated herein are numerous and not limited to any particular implementation. For example, ranging codes having an ordered (whether alphabetical or numeric or alphanumeric) set may be distinguished in one example by simply being in a certain final percentage in the ordered set that invokes a particular code's function and where the remaining percentage of codes in the ordered set will optionally invoke the methods described herein only when there is sufficient network capacity. For example, a code in the last 10% of codes can invoke the fast call setup while the remaining 90% of code optionally may invoke the fast call setup only when sufficient network capacity is measured and deemed adequate.

Further note that a range request (RNG_REQ) may include one or more of a numerous array of information elements, such as a Burst Profile, a Ranging Purpose Indication, an SS MAC Address, a MAC Version, Ranging Anomalies, an AAS broadcast capability, a Serving Base Station Identifier (BSID), a Paging Controller ID, a HO_ID, a MAC Hash Skip Threshold, a Power Down Indicator, a Power_Saving_Class_Parameter, or an HMAC/CMAC Tuple. Note, the HMAC/CMAC tuple may replace an "Authentication Response" element or may be in addition to the authentication response.

Figure 3:
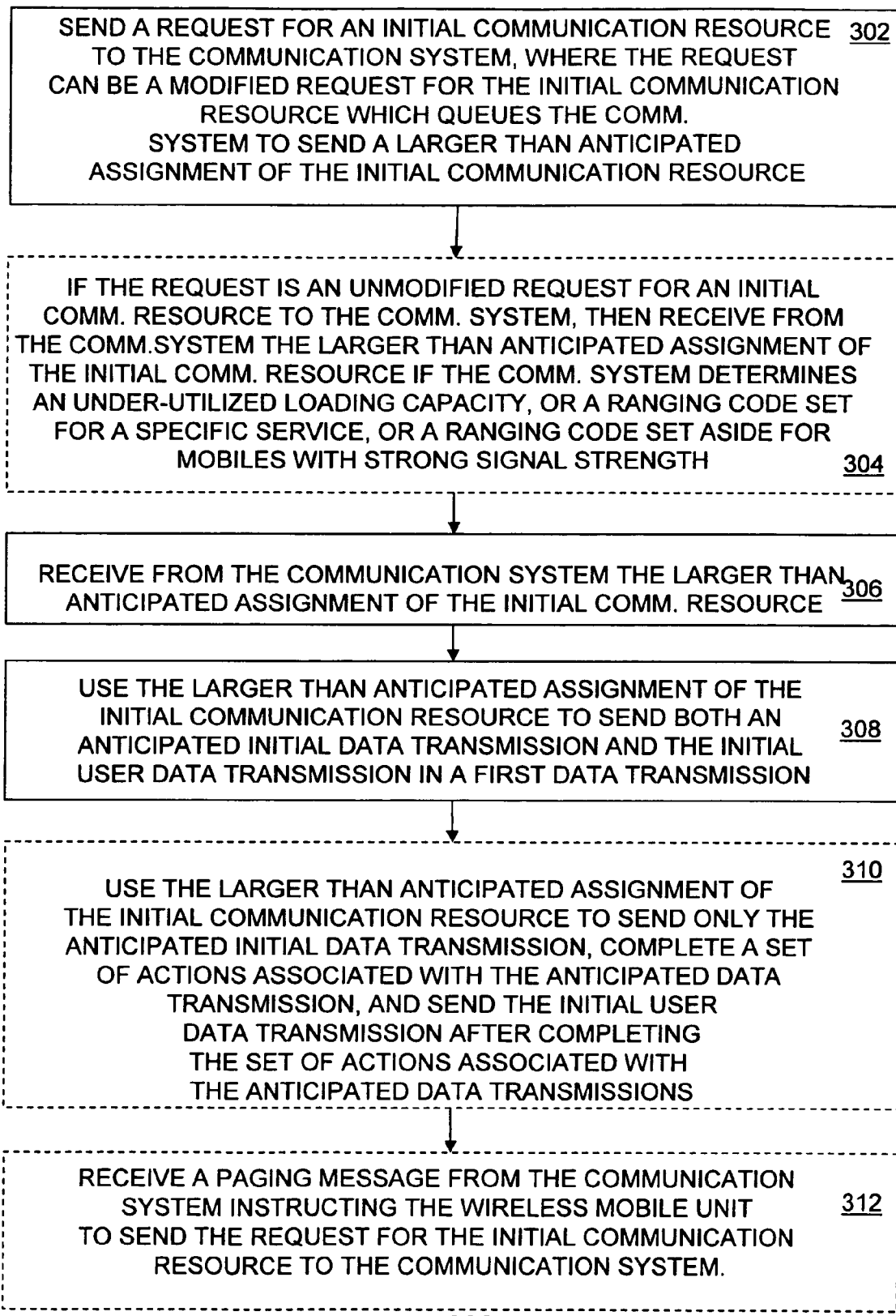
FIG. 3 is a flow chart illustrating a method of streamlining a call setup in accordance with various embodiments of the present invention.

Referring to FIG. 3, a method 300 executed by a wireless communication or mobile unit, such as wireless mobile unit 102, of streamlining an initial user data transmission from the wireless communication or mobile unit to a communication system is described in accordance with various embodiments of the present invention. The method begins with the step 302 of sending a request for an initial communication resource to the communication system, where the request can be a modified request for the initial communication resource which causes or queues the communication system to send a larger than anticipated assignment of the initial communication resource. In this regard, the modified request may include a ranging code message or other alternative code that triggers or queues the larger than anticipated assignment. The wireless communication unit then receives the larger than anticipated assignment of the initial communication resource at step 306. Note, the request may also be an unmodified request.

At optional or alternative step 304, if the request is an unmodified request for an initial communication resource to the communication system, then the wireless communication unit may receive from the communication system the larger than anticipated assignment of the initial communication resource if the communication system determines an underutilized loading capacity. In a further refinement, the unmodified request may be sent and the larger than anticipated assignment may be received if one or more of the following is true: that the communication system determines an underutilized loading capacity; that the wireless mobile unit originated on a ranging code set aside for a specific service; or that the wireless mobile unit originated on a ranging code set aside for wireless mobiles with particularly good signal strength.

At step 308, the wireless mobile unit uses the larger than anticipated assignment of the initial communication resource to send both an anticipated initial data transmission and the initial user data transmission in a first data transmission. In another alternative or optional step 310, the wireless communication unit instead may use the larger than anticipated assignment of the initial communication resource to send only the anticipated initial data transmission, to complete a set of actions associated with the anticipated data transmission, and to send the initial user data transmission after completing the set of actions associated with the anticipated data transmissions. Step 310 may be implemented in the case where a page response is sent in a PoC ping method for example. The method 300 may also optionally include the step 312 of receiving, by the wireless mobile unit, a paging message from the communication system instructing the wireless mobile unit to send the request for the initial communication resource to the communication system. Note, the anticipated initial data transmission may include a plurality of data items among a list of data items including a range request and an authentication response and the initial user data transmission may be an IP packet.

Figure 4:
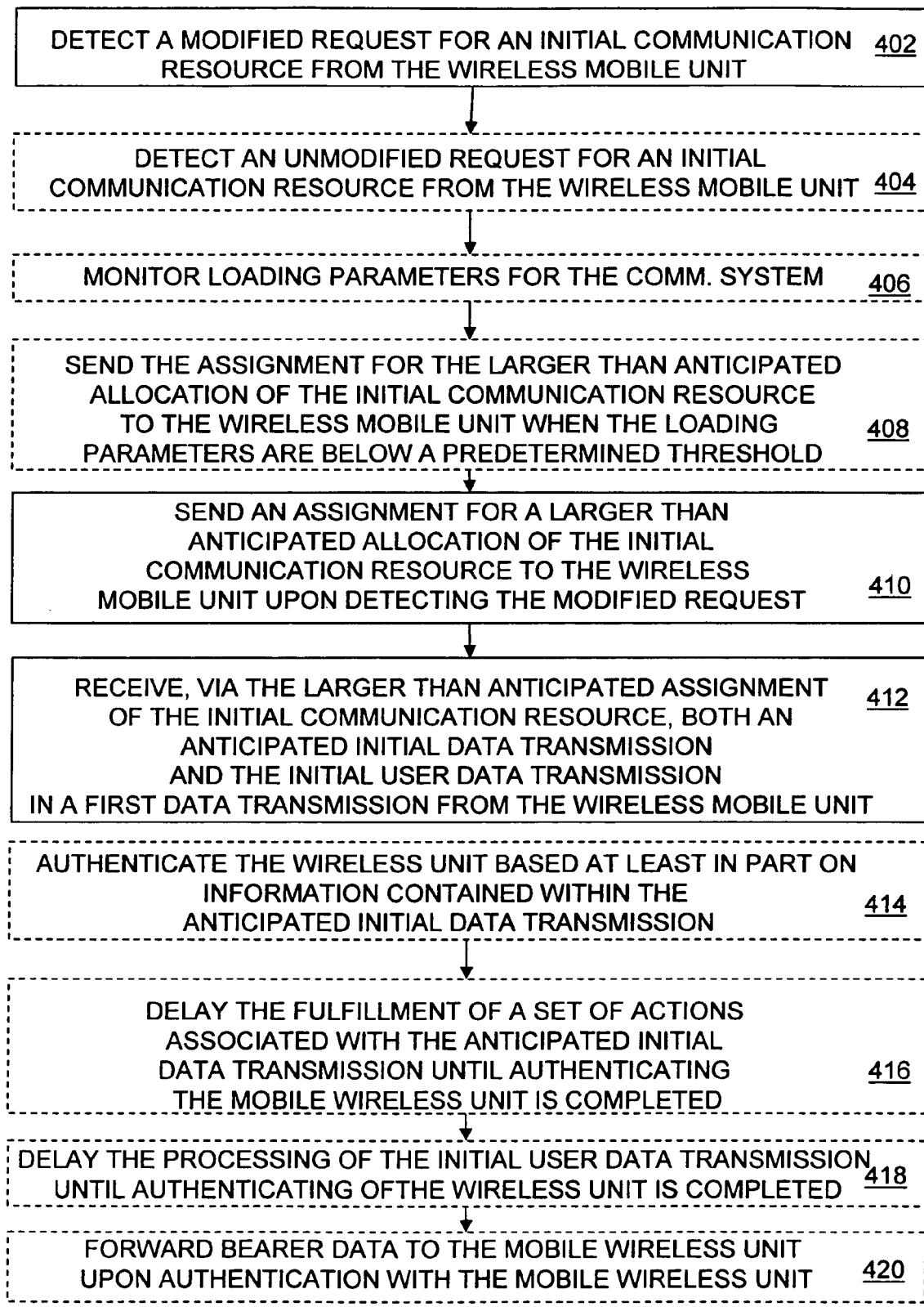
FIG. 4 is a flow chart illustrating a method of streamlining a call setup in accordance with various embodiments of the present invention.

Referring to FIG. 4, a method 400 executed by a communication system, such as by network 104, for example, by a network communication device such as base station 106, of streamlining an initial user data transmission from a wireless mobile unit to the communication system is described in accordance with various embodiments of the present invention. The method 400 begins with the step 402 of detecting a modified request for an initial communication resource from the wireless mobile unit, sending an assignment for a larger than anticipated allocation of the initial communication resource to the wireless mobile unit upon detecting the modified request at step 410, and receiving, via the larger than anticipated assignment of the initial communication resource, both an anticipated initial data transmission and the initial user data transmission in a first data transmission from the wireless mobile unit at step 412. The method 400 may also include the optional steps of detecting an unmodified request for an initial communication resource from the wireless mobile unit at step 404, monitoring loading parameters for the communication system at step 406, and sending the assignment for the larger than anticipated allocation of the initial communication resource to the wireless mobile unit when the loading parameters are below a predetermined threshold at step 408.

The method 400 may further include the step 414 of authenticating the mobile wireless unit based at least in part on information contained within the anticipated initial data transmission. At step 416, the method 400 may optionally delay the fulfillment of a set of actions associated with the anticipated initial data transmission until authenticating the mobile wireless unit is completed. In another alternative, the method 400 may delay the processing of the initial user data transmission until authenticating the mobile wireless unit is completed at step 418. At step 420, the communication system may forward bearer data to the mobile wireless unit upon authentication of the mobile wireless unit. Note, the bearer data may be forwarded to the network or the target mobile wireless unit and the destination of the data being sent by the originating mobile may be any address on a network or the Internet.

Figure 5:
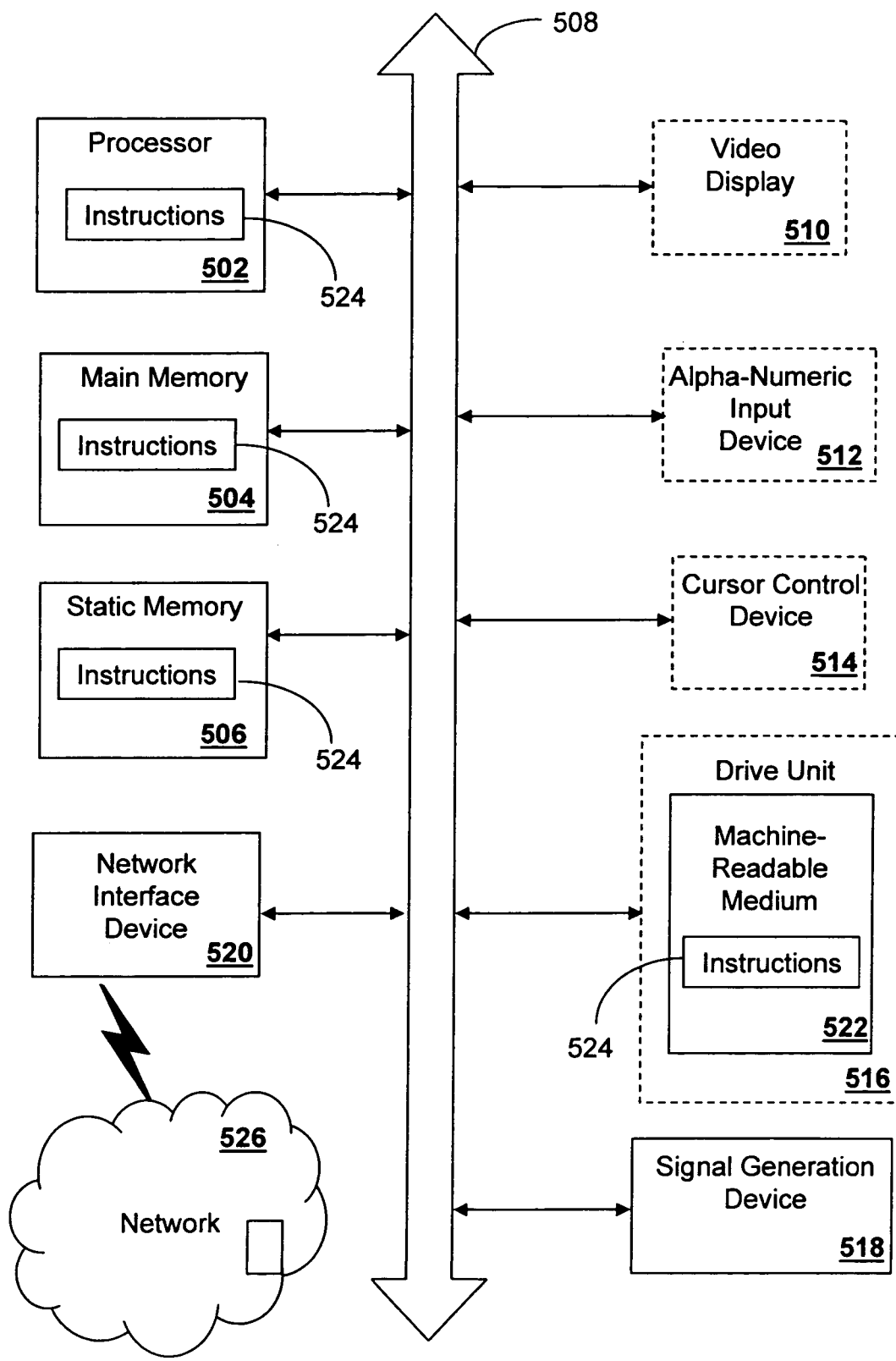
FIG. 5 is a block diagram of a communication device in accordance with an embodiment of the present invention.

FIG. 5 depicts an exemplary diagrammatic representation of a machine in the form of a computer system 500 within which a set of instructions, when executed, may cause the machine to perform any one or more of the methodologies discussed above. In some embodiments, the machine may operate as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, a server, or any machine capable of executing a set of instructions (sequential or otherwise) that specify actions to be taken by that machine, not to mention a base station or mobile client device. For example, one version of the machine may comprise a mobile communication device, such as mobile wireless unit 102, and perform the functions described herein as being performed by the mobile wireless unit, while another version of the machine may comprise a network communication device, such as base station 106, that resides in the communication system, and more particularly in network 104, and performs the functions described herein as being performed by the communication system or the network. It further will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a controller or processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520. The machine may further include a transceiver (not shown), coupled to the bus 508, for receiving transmissions from and conveying transmissions to a device external to the device in which the machine resides. For example, when the machine 500 resides in a wireless mobile unit or a base station, the transceiver may be capable of receiving and conveying transmissions via an air interface. Of course, in the embodiments disclosed, many of these items are optional. For example, when machine 500 comprises a mobile communication device such as mobile wireless unit 102, for example but not limited to a cellular telephone, a radio telephone, a personal digital assistant (PDA) with radio frequency (RF) capabilities, a wireless modem that provides an RF interface for digital terminal equipment (DTE) such as a laptop computer, or any other device that is capable of sending and receiving communication signals on a wireless network, the machine may or may not include each of disk drive unit 516 and network interface device 520.

The disk drive unit 516 may include a machine-readable medium 522 on which is stored one or more sets of instructions (e.g., software 524) embodying any one or more of the methodologies or functions described herein, including the methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices may likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations may include, but not be limited to, distributed processing or component object distributed processing, parallel processing, or virtual machine processing may also be constructed to implement the methods described herein.

The present disclosure contemplates a machine readable medium containing instructions 524, or that which receives and executes instructions 524 from a propagated signal so that a device connected to a network environment 526 may send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" may be taken to include a single medium or multiple media (e.g., a centralized or distributed database, and/or associated caches and servers) that store the one or more sets of instructions. The term "machine-readable medium" may also be taken to include any medium that is capable of storing, encoding or carrying a set of instructions for execution by the machine and that cause the machine to perform any one or more of the methodologies of the present disclosure. The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

It will be appreciated that embodiments of the invention described herein may be comprised of one or more conventional processors and unique stored program instructions that control the one or more processors to implement, in conjunction with certain non-processor circuits, some, most, or all of the functions of the embodiments of the invention described herein. The non-processor circuits may include, but are not limited to, a radio receiver, a radio transmitter, signal drivers, clock circuits, power source circuits, and user input devices.

As such, these functions may be interpreted as steps of a method to facilitate access to a mobile server. Alternatively, some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. In those situations for which functions of the embodiments of the invention may be implemented using a processor and stored program instructions, it will be appreciated that one means for implementing such functions is the media that stores the stored program instructions, be it magnetic storage or a signal conveying a file. Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments of the present invention have been described. However, one of ordinary skill in the art appreciates that various modifications and changes may be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued In light of the foregoing description, it should be recognized that embodiments in accordance with the present invention may be realized in hardware, software, or a combination of hardware and software. A network or system according to the present invention may be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention may be realized in numerous configurations contemplated to be within the scope and spirit of the claims. Additionally, the description above is intended by way of example only and is not intended to limit the present invention in any way, except as set forth in the following claims.

What is claimed is:

1. A method of streamlining an initial user data transmission from a wireless mobile unit to a communication system, comprising the steps of:
   sending a request for an initial communication resource to the communication system;
   receiving from the communication system a larger than anticipated assignment of the initial communication resource; and
   using the larger than anticipated assignment of the initial communication resource to send both an anticipated initial data transmission and the initial user data transmission in a first data transmission.

2. The method of claim 1, wherein the anticipated initial data transmission comprises one or more of a range request, an authentication response, a requested downlink burst profile, a ranging purpose indication, an SS MAC address, a MAC version, ranging anomalies, an AAS broadcast capability, a serving BSID, a paging controller ID, a HO ID, a MAC Hash skip threshold, a power down indicator, a power saving class parameter, and an HMAC/CMAC Tuple.

3. The method of claim 1, wherein the step of sending the request comprises sending an unmodified request for the initial communication resource to the communication system and receiving from the communication system the larger than anticipated assignment of the initial communication resource if one or more of the following is true:
   the communication system determines an under-utilized loading capacity;
   the wireless mobile unit originated on a ranging code set aside for a specific service; or
   the wireless mobile unit originated on a ranging code set aside for mobiles with particularly good signal strength.

4. The method of claim 1, wherein the step of sending the request comprises sending an unmodified request for an initial communication resource to the communication system and the method further comprises the step of receiving from the communication system a larger than anticipated assignment of the initial communication resource if the communication system determines an under-utilized loading capacity.

5. The method of claim 4, further comprising the steps of:
   performing the following actions when the mobile wireless unit has sent an unmodified request for the initial communication resource to the communication system and has received from the communication system the larger than anticipated assignment of the initial communication resource:
   using the larger than anticipated assignment of the initial communication resource to send only the anticipated initial data transmission;
   completing a set of actions associated with the anticipated data transmission; and
   after completing the set of actions associated with the anticipated data transmissions, sending the initial user data transmission.

6. The method of claim 1, wherein the step of sending the request comprises sending a modified request for the initial communication resource which causes the communication system to send the larger than anticipated assignment of the initial communication resource.

7. The method of claim 1, wherein the method further comprises the step of receiving a paging message from the communication system instructing the wireless mobile unit to send the request for the initial communication resource to the communication system.

8. A method of streamlining an initial user data transmission from a wireless mobile unit to a communication system, comprising the steps of:
   detecting a modified request for an initial communication resource from the wireless mobile unit;

sending an assignment for a larger than anticipated allocation of the initial communication resource to the wireless mobile unit upon detecting the modified request; and receiving, via the larger than anticipated assignment of the initial communication resource, both an anticipated initial data transmission and the initial user data transmission in a first data transmission from the wireless mobile unit.

9. The method of claim 8, further comprising:

detecting an unmodified request for an initial communication resource from the wireless mobile unit;

monitoring loading parameters for the communication system; and sending the assignment for the larger than anticipated allocation of the initial communication resource to the wireless mobile unit when the loading parameters are below a predetermined threshold.

10. The method of claim 8, wherein the anticipated initial data transmission includes a plurality of data items among a list of data items including a range request and an authentication response and the initial user data transmission is an IP packet.

11. The method of claim 8, wherein the method further comprises the steps of:

authenticating the mobile wireless unit based at least in part on information contained within the anticipated initial data transmission;

delaying the fulfillment of a set of actions associated with the anticipated initial data transmission until authenticating the mobile wireless unit is completed; and delay processing the initial user data transmission until authenticating the mobile wireless unit is completed.

12. The method of claim 11, wherein the method further comprises the step of forwarding bearer data to the mobile wireless unit upon authentication of the mobile wireless unit.

13. A mobile wireless unit capable of streamlining an initial user data transmission from a wireless mobile unit to a communication system, comprising:

a transceiver; and a controller coupled to the transceiver, wherein the controller is programmed to:

send a request for an initial communication resource to the communication system;

receive from the communication system a larger than anticipated assignment of the initial communication resource; and use the larger than anticipated assignment of the initial communication resource to send both an anticipated initial data transmission and the initial user data transmission in a first data transmission.

14. The mobile wireless unit of claim 13, wherein the anticipated initial data transmission includes a plurality of data items from a list of data items including a range request and an authentication response and the initial user data transmission is an IP packet.

15. The mobile wireless unit of claim 13, wherein the controller is further programmed to:

send an unmodified request for an initial communication resource to the communication system; and receive from the communication system the larger than anticipated assignment of the initial communication resource when a loading parameter measured at the communication is below a predetermined threshold.

16. The mobile wireless unit of claim 13, wherein the controller is further programmed to receive a paging message from the communication system instructing the mobile wireless unit to send a request for an initial communication resource to the communication system.

17. The mobile wireless unit of claim 13, wherein the mobile wireless unit streamlines call setup for a Voice over Internet Protocol (VoIP) call setup or for a push-to-talk call setup or for a push-to-connect over cellular (PoC) call setup.

18. A communication device capable of streamlining an initial user data transmission from a wireless mobile unit, comprising:

a transceiver; and a controller coupled to the transceiver, wherein the controller is programmed to:

detect a modified request for an initial communication resource from the wireless mobile unit;

send an assignment for a larger than anticipated allocation of the initial communication resource to the wireless mobile unit upon detecting the modified request; and receive, via the larger than anticipated assignment of the initial communication resource, both an anticipated initial data transmission and the initial user data transmission in a first data transmission from the wireless mobile unit.

19. The communication device of claim 18, wherein the controller is further operating within a communication system and programmed to:

detect an unmodified request for an initial communication resource from the wireless mobile unit;

monitor loading parameters for the communication system; and send an assignment for a larger than anticipated allocation of the initial communication resource to the wireless mobile unit when the loading parameters are below a predetermined threshold.

20. The communication device of claim 18, wherein the controller is further programmed to:

authenticate the mobile wireless unit based at least in part on information contained within the anticipated initial data transmission;

delay the fulfillment of a set of actions associated with the anticipated initial data transmission until authenticating the mobile wireless unit is completed; and delay processing the initial user data transmission until authenticating the mobile wireless unit is completed.

* * * * *